Oct. 11, 1960    R. R. SMESSAERT    2,956,123
METHODS OF AND APPARATUS FOR TESTING TELEGRAPH PRINTERS
Filed Oct. 29, 1957    2 Sheets-Sheet 1

INVENTOR
RAYMOND R. SMESSAERT
BY R.C.Terry
ATTORNEY

Oct. 11, 1960  R. R. SMESSAERT  2,956,123
METHODS OF AND APPARATUS FOR TESTING TELEGRAPH PRINTERS
Filed Oct. 29, 1957  2 Sheets-Sheet 2

INVENTOR
RAYMOND R. SMESSAERT
BY R.C.Terry
ATTORNEY

United States Patent Office 2,956,123
Patented Oct. 11, 1960

2,956,123
METHODS OF AND APPARATUS FOR TESTING TELEGRAPH PRINTERS

Raymond R. Smessaert, Chicago, Ill., assignor to Teletype Corporation, Chicago, Ill., a corporation of Delaware Filed Oct. 29, 1957, Ser. No. 693,164

10 Claims. (Cl. 178—69)

This invention relates to methods of and apparatus for testing telegraph printers, and more particularly to methods of and apparatus for testing the operation of a telegraph printer with respect to the operation of a reference standard printer of known operating capability.

A common expedient in the testing of telegraph printers includes the operation of the printer by a series of signals representing a test message. For example, the so-called "quick brown fox" message is often used, since such a message selects substantially all characters and functions of the printer. Obviously, in the manufacture of large numbers of telegraph printers, this method of testing such printers is time consuming, costly and onerous. Pages must be positioned in the printer on which to reproduce the test message, and a checker must review each message to determine whether or not the printer under test is operating properly.

An object of this invention is to provide new and improved methods of and apparatus for testing telegraph printers.

Another object of this invention is to provide methods of and apparatus for testing telegraph printers in a simpler, faster and more adequate manner than heretofore possible.

A further object of this invention is to provide new and improved methods of and apparatus for comparing the operation of a telegraph printer with the operation of a standard printer of known operating capability.

With these and other objects in view, a method of testing selective operations in a telegraph printer, embodying certain features of the invention, may include operating a printer to be tested and a reference standard printer in response to identical telegraph signals, developing in the printers electrical potentials which differ for different selective operations in each printer and correspond for like selective operations in the two printers, and comparing the potentials developed in said printers for each received signal.

Apparatus for testing telegraph printers wherein a plurality of type pallets is actuated selectively to print a message, and embodying certain features of the invention, may include resistance means associated with each type pallet, means for electrically connecting the resistance means in series, a bridge circuit having a testing arm therein and means for connecting a predetermined number of the serially-connected resistance means in the testing arm as determined by the type pallet selected.

More particularly, the invention is illustrated in the testing of telegraph printers of the type disclosed in Patent No. 2,505,729 to W. J. Zenner, referred to hereinafter as the "first Zenner patent." Figs. 44 to 46, inclusive, of this patent show a type-pallet carrier 99 or a type box which this printer utilizes in lieu of the more-common type carriage, such as a wheel or type basket. This patent also discloses means for positioning the type box 99 in vertical and horizontal directions to place predetermined type pallets 155—155 in line with a print hammer 362 (Fig. 22). Thereafter, upon actuation of the print hammer 362, the type pallet 155 is moved from an initial position in the type box 99 to a printing position adjacent to a platen 499. A page is carried by the platen 499, an dactuation of a type pallet to the printing position impresses thereon the character formed on the type pallet 155.

A type box which is an improvement over that disclosed in the first Zenner patent is disclosed in Patent No. 2,577,064 to W.J. Zenner, referred to hereinafter as the "second Zenner patent." The type box used to illustrate the operation of the present invention is a modification of this latter type box. In the second Zenner patent, pallets 11—11 are held in their normal position within the type box by springs 12—12 (Fig. 3). A feature of the present invention includes replacing the metallic springs 12—12 of the second Zenner patent with compression springs made of a material having a predetermined amount of electrical resistance. These springs are connected electrically to a point on the shank of the type pallet, but otherwise they are insulated therefrom.

The springs are also connected together electrically in a series circuit. Such a type box is placed in a printer to be tested and in a reference standard printer of the same type. With respect to the printer under test, a predetermined one of the type pallets is connected to one side of a testing arm in a comparison bridge circuit, and the print hammer therein is connected to the other side of the testing arm. Obviously, when the print hammer actuates any of the type pallets, the circuit in the testing arm is completed to place a predetermined amount of resistance in the testing arm of the bridge circuit, as determined by the selected type pallet. Similarly, a predetermined one of the type pallets in the reference printer is connected to one side of a reference arm in the comparison bridge circuit, and the print hammer of the reference printer is connected to the other side of the reference arm.

Both printers are then energized simultaneously by similar signals. Consequently, both printers should select similar type pallets, and, hence, place similar amounts of resistance in the testing arm and the reference arm of the bridge circuit. If the printer under test selects an improper type pallet, a resistance different from that which the reference printer places in the reference arm of the bridge circuit is placed in the testing arm thereof. As a result, an output voltage is derived from the bridge circuit and is impressed on a utilization circuit to arrest the operation of the printer under test and to give some visual indication of the improper operation thereof.

A complete understanding of the invention may be obtained from the following detailed description, when taken in conjunction with the accompanying drawings, in which.

Figure 1:
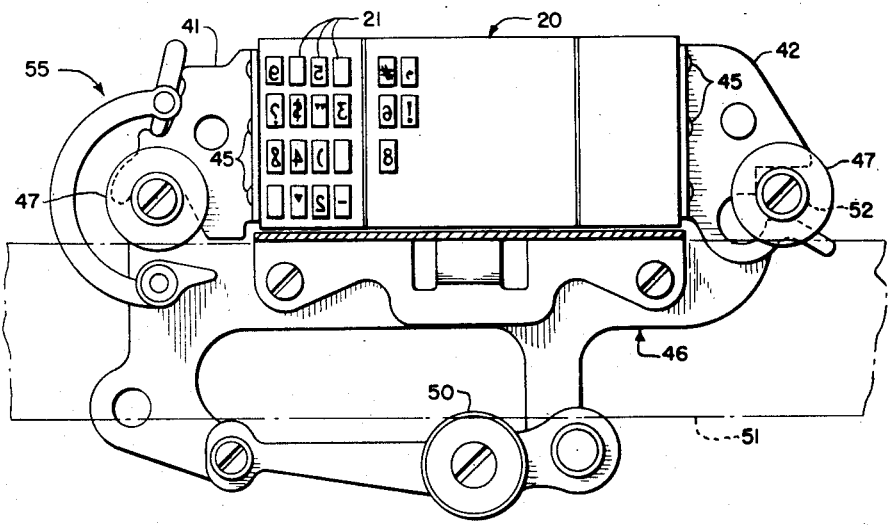
Fig. 1 is an elevation view of a type box used in the invention.
Figure 2:
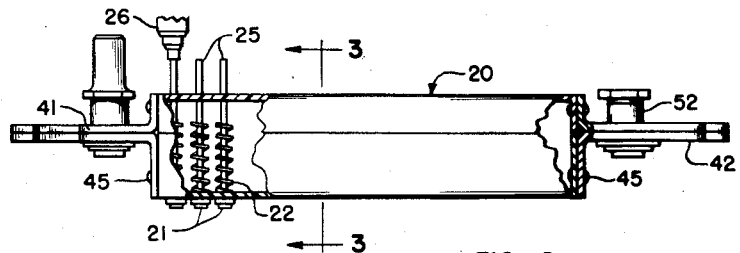
Fig. 2 is a top plan view of the type box shown in Fig. 1 with parts thereof being broken away to show the inner construction more clearly.
Figure 3:
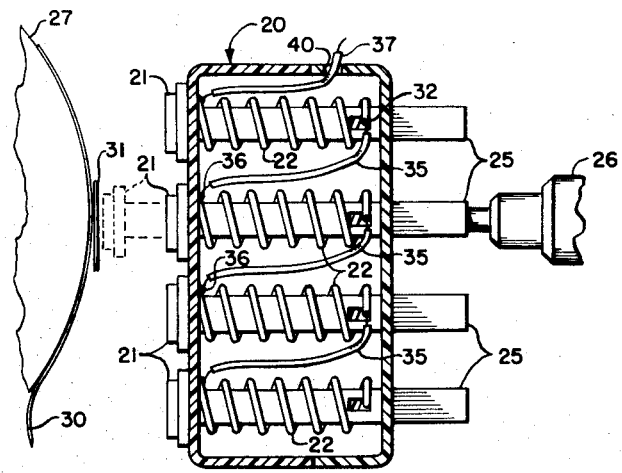
Fig. 3 is a vertical section taken along the line 3—3 of Fig. 2.

Referring now to the drawings, and more particularly to Figs. 1, 2 and 3, there is shown a type box or carrier 20 which is a modified version of the type box 10 disclosed in the second Zenner patent. The type box 20 comprises a hollow, box-like structure having aligned apertures in the front and rear faces thereof into which a plurality of type pallets 21—21 are slidably supported. According to the present invention, the type box 20 is composed of any suitable electrical insulating material for reasons which will become more apparent hereinafter. A coiled compression spring 22 having one end secured to a shank 25 of each type pallet 21 encircles the type pallet and functions to hold the pallet in its retracted position in Figs. 2 and 3. A print hammer 26, when actuated by instrumentalities disclosed in the first Zenner patent, moves preselected pallets 21—21 from their initial positions within the type box 20 to printing positions, illustrated in Fig. 3 by dashed lines, adjacent to a platen 27. A page 30, on which a message is to be reproduced, is secured to the platen 27, and the pallet 21 is pressed against an inked ribbon 31 and the page 30 to reproduce the character thereon on the page.

Each compression spring 22 is composed of a given length of a material having a predetermined amount of electrical resistance per unit length and is connected electrically to its associated shank 25 at a point 32. The remainder of each spring 22 is insulated from its associated pallet shank 25 by, for example, an insulated covering surrounding the complete length of the spring. All of the springs 22—22 in the type box 20 are connected in series electrically by connecting short lengths of conductors 35—35 between the point 32 at the end of any given spring 22 and the opposite end of the succeeding spring 22 at a point 36. The last spring 22 in the series circuit is connected to a conductor 37 which is passed through an aperture 40 in the type box 20 to a point without the type box. The type pallet 21 and spring 22 with which the conductor 37 is associated may be the type pallet in the upper, left-hand corner of the type box 20 as viewed in Fig. 1.

The type box 20 of insulating material is connected to flanges 41 and 42 by a plurality of rivets 45—45. The flanges 41 and 42 cooperate with the appropriate instrumentalities on a traveling carriage 46 of the printer, and the type box 20 is thereby rendered removably mountable on the carriage 46. Similar to the disclosure in the second Zenner patent, the carriage 46 (which is comparable to the carriage 15 of the second Zenner patent) is provided with a pair of upper rollers 47—47 and a lower roller 50, adapted to ride on the upper and lower edges of a track member 51 (similar to the track member 18 of the second Zenner patent). The moving of the carriage 46 for character spacing is achieved in the manner disclosed in the second Zenner patent. The remaining structure found in Figs. 1 to 3, inclusive, is also similar to that disclosed in this patent. For example, the type box 20, through its flange 42, is mounted pivotally to the carriage 46 on a stud shaft 52. Also, the type box 20 is secured to its position on the carrier 46 by a clamping device 55 which is effective to hold the type box 20 tightly in its home position on the carriage 46.

Figure 4:
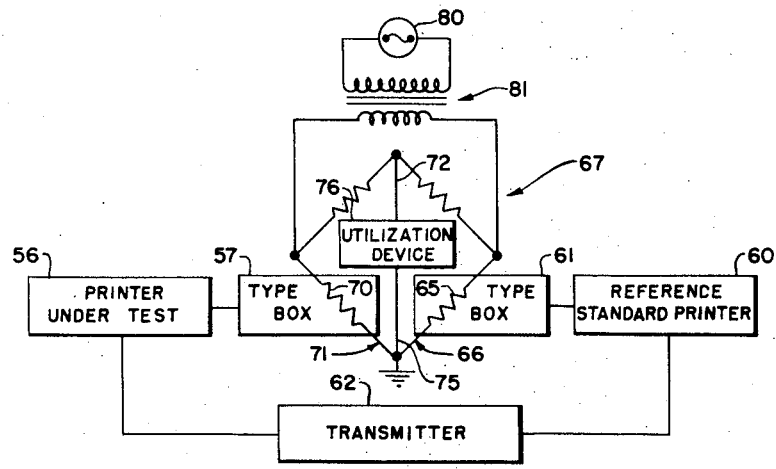
Fig. 4 is a functional diagram of a circuit arrangement according to the invention for comparing a telegraph printer with a reference printer.

To illustrate the operation of the invention, a type box of the type shown in Figs. 1 to 3, inclusive, is inserted into a printer to be tested in a manner disclosed in the second Zenner patent. Also, a similar type box is inserted into a reference printer of a similar type. Referring to Fig. 4, the printer under test is designated by the numeral 56, and a testing type box, such as the one shown in Figs. 1 to 3, inclusive, associated therewith is designated by the numeral 57. Likewise, a reference printer 60, against which the operation of the printer 56 under test is to be compared, has associated therewith a testing type box designated by the numeral 61. Both printers 56 and 60 are simultaneously operated with similar signals from a transmitter 62 to cause the type boxes 57 and 61 to be actuated and, if desired, to cause the printing of test messages generated by the transmitter 62.

When the print hammer associated with the type box 61 in the reference printer 60 strikes a type pallet 21, a predetermined amount of resistance is placed in a circuit between the associated conductor 37 (Fig. 3) in the type box 61 and the print hammer. This resistance is shown schematically in Fig. 4 as a resistor 65, and the resistor 65 is shown connected in a reference arm 66 of a comparison bridge circuit 67. In a similar manner, the signal from the transmitter 62 causes the print hammer in the printer 56 under test to actuate a pallet 21 in the type box 57 and to place a predetermined amount of resistance between the associated conductor 37 in the type box 57 and the print hammer in the printer 56 under test. This resistance is represented by a resistor 70 in Fig. 4 and is shown connected in a testing arm 71 of the comparison bridge circuit 67.

Since both printers 56 and 60 are operated with similar signals from the transmitter 62, similar pallets in both printers should be actuated by their associated print hammers, and, consequently, similar amounts of resistance should be placed in the reference arm 66 and the test arm 71 of the bridge circuit 67. In other words, the resistors 65 and 70 will be equal in value if the printer 56 under test is operating properly and in a manner similar to the reference printer 60. When the resistors 65 and 70 are equal in value, the comparison bridge 67 is balanced so that no output voltage is impressed across output leads 72 and 75 to energize a utilization device 76. The utilization device may include means for disabling the transmitter 62 and for giving some visual indication of the improper operation thereof. Such a utilization device 76 will be energized when a similar signal is applied to the printers 56 and 60 and the printer 56 under test selects an improper type pallet, as compared to the pallet selected in the reference printer 60, so that the bridge circuit 67 is unbalanced, and an output voltage appears across the leads 72 and 75.

Figure 5:
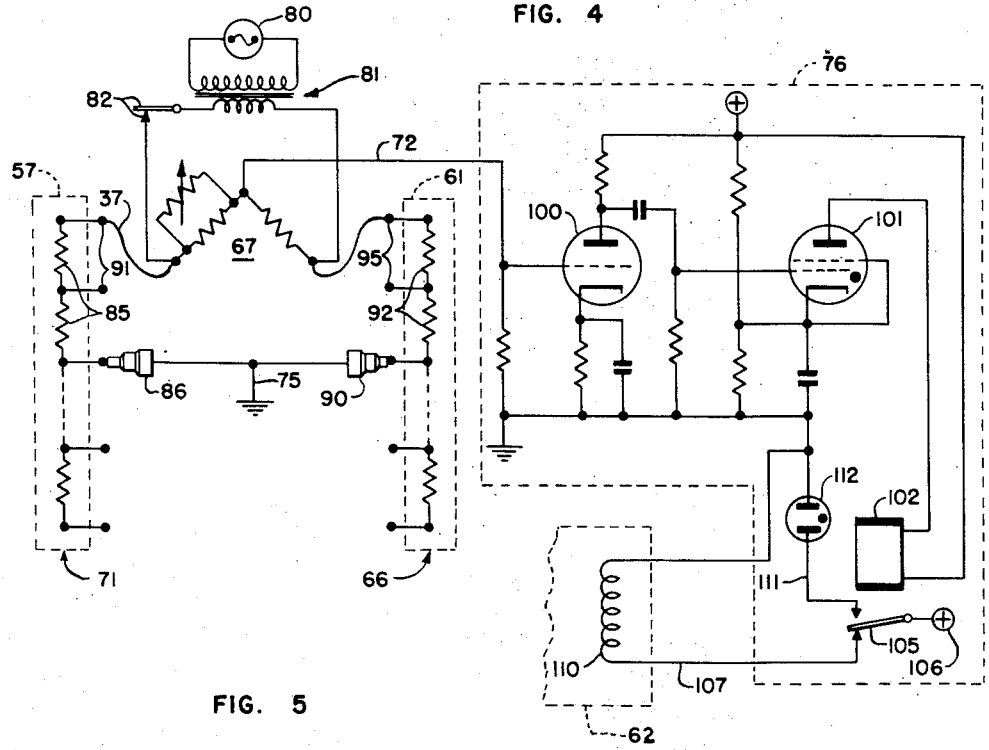
Fig. 5 is a more-detailed circuit for comparing the operation of a printer under test with that of the reference printer.

Fig. 5 shows a more-detailed view of the comparison bridge circuit 67. As shown therein, an output voltage from a bridge-energizing source 80 is passed through a transformer 81, and the secondary of the transformer has connected in series therewith timing contacts 82—82. The timing contacts 82—82 are energized by instrumentalities (not shown) which cause their closure after the print hammers associated with the printer 56 under test and the reference printer 60 have contacted the selected pallets. Also, the timing contacts are designed to open before the print hammers are removed from contact with the selected pallets.

With the provision of the timing contacts 82—82, there is no chance for the bridge 67 to be unbalanced due to the print hammers' contacting their selected pallets at slightly different times. This can possibly happen even though the print hammer associated with the printer 56 under test is actuating the proper pallet as compared to the selected pallet in the reference printer 60. Since this would not indicate an improperly-operating printer 56 under test, the transmitter 62 should not be stopped from operation for this reason. Consequently, with the provision of the timing contacts 82—82, the operation of the transmitter 62 will be stopped only when an improper type pallet has been selected, as compared to the pallet selected by the reference printer 60.

The compression springs 22—22 in the type box 57 associated with the printer 56 under test are designated in Fig. 5 by a plurality of resistors 85—85. When describing the compression springs 22—22, it was stated that the springs are connected electrically in a series circuit, and that the pallet at the end of the series cricuit is connected to one side of the testing arm 71 of the bridge circuit 67. This latter connection is made by the conductor 37 in Fig. 3 and by a similarly-designated conductor in Fig. 5. Referring to Fig. 5, it can be seen that the conductor 37 is connected to the upper side of the testing arm 71 in the comparison bridge circuit 67. The other side of the testing arm 71 may be placed at ground potential, which is the potential of the print hammers associated with the printer 56 under test and the reference printer 60.

The print hammer associated with the printer 56 under test, is designated by the numeral 86 in Fig. 5, and the print hammer associated with the reference printer 60 is designated by the numeral 90 in this figure. The points of contact between the print hammer 86 and the type pallets 21—21 in the type box 57 are designated by the numerals 91—91 in Fig. 5. It can be seen that as the print hammer 86 contacts different ones of the points 91—91, different amounts of resistance will be introduced into the testing arm 71 of the bridge circuit 67. In a similar manner, the print hammer 90 is associated with resistors 92—92, representing the compression springs 22—22 in the reference printer 60. Since the print hammer 90 is also connected to ground potential, when it contacts any of a plurality of points 95—95, representing the associated pallets 21—21 in the standard printer 60, a predetermined amount of resistance is introduced into the reference arm 66 of the bridge circuit 67. For each point 91 there is a corresponding point 95, and when the print hammers 86 and 90, respectively, contact these corresponding points, equal amounts of resistance are placed in the testing arm 71 and the reference arm 66 of the bridge circuit 67.

Since the resistors 85—85 and 92—92 are of equal value, if the type-box-positioning instrumentalities in the printer 56 under test have improperly positioned the type box 57, the print hammer 86 associated therewith and the print hammer 90 in the reference printer 60 will contact non-corresponding points 91—91 and 95—95, respectively. Consequently, an unequal amount of resistance will be placed in the testing arm 71 of the bridge circuit 67 as compared to that which is placed in the reference arm 66 thereof. As a result, an output potential will appear between the grounded lead 75 and the output lead 72 and will be applied to the utilization device 76. This voltage is impressed on the control grid of an amplifier tube 100 in the utilization device 76, wherein it is amplified, and is applied to the control grid of a thyratron 101. Normally, the thyratron 101 is extinguished, and a relay coil 102, in the anode circuit thereof, is not energized. Consequently, an armature 105 associated with the coil 102 normally connects a positive potential source 106 to a lead 107 and to a clutch solenoid 110 in the transmitter 62. Energization of the clutch solenoid 110 maintains the transmitter 62 in an operable condition to transmit signals to the printer 56 under test and the reference printer 60. Also, with the armature 105 in the position shown in Fig. 5, no potential is applied over a lead 111 to an indicating lamp 112 so that this lamp is normally extinguished.

When, however, the bridge circuit 67 is unbalanced, an output voltage therefrom is impressed over the lead 72, is amplified in the tube 100 and renders the thyratron 101 conductive. Consequently, the coil 102 is energized to move the armature 105 upwardly and to remove the positive source 106 from the lead 107 and the clutch solenoid 110. The clutch associated with the clutch solenoid 110 is thereby de-energized, and the transmitter 62 is stopped to preclude the application of further test signals to the printers 56 and 60. Also, with the armature 105 in its upward position, the positive potential of the source 106 is applied over the lead 111 and to the lower side of the indicating lamp 112, the upper side of which is connected to ground potential, thereby energizing this lamp. As a result, not only is the operation of the transmitter 62 halted, but also the lamp 112 is energized to give an indication that the printer 56 under test has selected an improper type pallet. The reason for such improper selection is then determined and repaired, and the operation of the printer 56 under test is again compared to that of the reference printer 60 until a predetermined number of signals indicate that the printer 56 under test is operating properly.

It is to be understood that the above arrangement of circuit elements, construction of component parts and method of operation are simply illustrative of an application of the principles of the invention, and many other modifications may be made without departing from the invention.

What is claimed is:

1. Apparatus for testing telegraph printers wherein a plurality of type pallets is actuated selectively to print a message, which comprises resistance means associated with each type pallet, means for electrically connecting the resistance means in series, a bridge circuit having a testing arm therein, and means for connecting a predetermined number of the serially-connected resistance means in the testing arm as determined by the type pallet selected.

2. Apparatus for testing telegraph printers wherein a plurality of type pallets is actuated selectively to print a message, which comprises electrical resistance elements connected in a series circuit, electrical connections from said type pallets to individual junctions of the resistance elements of the series circuit, means for actuating the pallets and thereby tapping a predetermined amount of resistance in the series circuit, a comparing circuit including serially-connected resistors corresponding successively to the resistance elements in the first-mentioned series circuit, and means for connecting the tapped resistance in the comparing circuit for comparison with a corresponding series of the serially-connected resistors.

3. Apparatus for testing the operation of a telegraph printer of the type wherein a type-pallet carrier is selectively positionable relative to a print hammer and the print hammer strikes predetermined pallets successively to move the pallets from an initial position to a printing position, which comprises a resilient element having a predetermined electrical resistance associated with and connected to each of the pallets for maintaining such pallet normally in its initial position, means for electrically connecting the resilient elements in series, a bridge circuit, and means for connecting the print hammer and one end of the series of resilient elements respectively to adjacent apices of the bridge circuit to cause completion of an arm of the bridge circuit incident to operation of the print hammer.

4. Apparatus for testing the operation of a telegraph printer with respect to the operation of a reference standard printer, which comprises means for representing corresponding selective printing operations of the two printers by equal value of electrical resistance, a comparison bridge including a testing arm and a reference arm and means for indicating dissimilarity between the two arms, means for connecting the resistances associated with the printer under test in the testing arm, means for connecting the resistances associated with the reference standard printer in the reference arm, and signal-transmitting means simultaneously operating the printers with similar message signals.

5. Apparatus for testing the operation of a telegraph printer with respect to the operation of a reference standard printer, which comprises resistance elements of equal value representing corresponding selective printing operations of the two printers, a comparison bridge including a testing arm and a reference arm, means for connecting the resistance elements associated with the printer under test in the testing arm, means for connecting the resistance elements associated with the reference standard printer in the reference arm, a signal-transmitting means operating the two printers simultaneously with similar message signals, and a utilization circuit operated by any dissimilarity between the testing arm and the reference arm for disabling the signal-transmitting means.

6. Apparatus for testing the operation of a telegraph printer with respect to the operation of a reference standard printer wherein each of the printers is of the type having a selectively-positionable type-pallet carrier in which predetermined pallets carried thereby are placed in line with a print hammer which is actuated to move the pallets from initial positions in the carrier to printing positions, the apparatus comprising a resilient element of a material having a predetermined electrical resistance secured to each of the pallets for retaining such pallet in its initial position, means for electrically connecting the resilient elements of the printer under test in series such that the print hammer taps a predetermined amount of resistance as it actuates each pallet, means similar to the last-mentioned means in the reference standard printer, a comparison means, means for connecting the tapped resistances of both printers in the comparison means, and utilization means operated by the comparison means upon comparison of dissimilar tapped resistances.

7. Apparatus for comparing the operation of a printer under test with the operation of a reference standard printer wherein each of the printers is of a type having a plurality of type pallets that are selectively actuated in accordance with predetermined signals, which comprises electrical resistors of equal value associated with corresponding pallets in the printers, conductor means for electrically connecting the resistors in each printer serially, a comparison circuit including a testing arm and a reference arm for comparing predetermined resistors in the reference standard printer with selected resistors in the printer under test, means for operating the printers simultaneously with similar signals, means for connecting the predetermined resistors of the reference standard printer in the reference arm of the comparison circuit as associated pallets in the reference standard printer are actuated by the signals, means for connecting the selected resistors of the printer under test in the testing arm of the comparison circuit as associated pallets in the printer under test are actuated by the signals, and utilization means operated upon any dissimilarity between the predetermined resistors in the reference standard printer and the selected resistors in the printer under test.

8. Apparatus for testing the operation of a telegraph printer with respect to the operation of a reference standard printer wherein each of the printers is of the type having a selectively-positionable type-pallet carrier in which predetermined pallets carried thereby are placed in line with a grounded print hammer which is actuated to move the pallets from initial positions in the carrier to printing positions, the apparatus comprising a resilient element of a material having a predetermined electrical resistance secured to each of the pallets for retaining such pallet in its initial position, means for electrically connecting the resilient elements of the printer under test in a series circuit, means similar to the last-mentioned means in the reference standard printer, a comparison bridge circuit including a testing arm and a reference arm, conductor means for connecting one end of the series circuit of the printer under test in the bridge testing arm and one end of series circuit of the reference standard printer in the bridge reference arm, the grounded print hammers completing the respective arms of the bridge and defining the amounts of resistance connected therein as they actuate selected type pallets, a signal transmitter for operating both printers simultaneously with similar message signals, utilization means including a relay operated by said bridge circuit as a result of dissimilarity between compared series resistance elements, and circuit means opened by the operation of the relay for rendering the signal transmitter inoperative and to stop the application of message signals to the printers.

9. Apparatus for testing the operation of a telegraph printer with respect to the operation of a reference standard printer wherein the printers are of a type having a type-pallet carrier that is positioned to place preselected pallets successively in alignment with a print hammer which is actuated to strike each pallet to move the pallets from their normal positions in the carrier to printing positions, the apparatus comprising a type-pallet carrier of electrical insulating material located in each of the printers and supporting electrically-conductive type pallets, a compression spring of a material having a predetermined electrical resistance electrically connected to each pallet and mechanically engaging the pallet for maintaining the associated pallet in its normal position in the carrier, conductor means for electrically connecting the springs associated with each carrier in a series circuit such that predetermined amounts of resistance exist between one end of such series circuit and each pallet, a bridge circuit having a testing arm and a reference arm, conductor means for connecting one end of the series circuit in the printer under test to one side of the testing arm, conductor means for connecting one end of the series circuit in the reference standard printer to one side of the reference arm of the bridge, means for electrically connecting the other sides of the testing and reference arms together and to the print hammers of the two printers, signal-transmitting means for operating the two printers simultaneously with similar signals, and utilization means actuable by an output voltage from the bridge circuit upon the selection of dissimilar type pallets by the printer under test and by the reference standard printer.

10. Apparatus for testing telegraph printers wherein a plurality of type pallets is actuated selectively to print a message, which comprises impedance means associated with each type pallet, means for electrically connecting the impedance means in series, a bridge circuit having a testing arm therein, and means for connecting a predetermined number of the serially-connected impedance means in the testing arm as determined by the type pallet selected.

References Cited in the file of this patent

UNITED STATES PATENTS

| | | |
|---|---|---|
| 1,460,530 | Brown et al. | July 3, 1923 |
| 2,599,392 | Kille | June 3, 1952 |
| 2,740,093 | Ammon | Mar. 27, 1956 |